US009527002B2

(12) United States Patent
Rudiger et al.

(10) Patent No.: US 9,527,002 B2
(45) Date of Patent: Dec. 27, 2016

(54) METHOD AND APPARATUS FOR THE LOW-TEMPERATURE FRACTIONATION OF A FLUID MIXTURE

(75) Inventors: Horst Rudiger, Augsburg (DE); Robert Eckl, Mehring (DE); Christoph Windmeier, Geretstried (DE); Alexander Beimler, Munich (DE); Yonggui Yu, Freising (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 165 days.

(21) Appl. No.: 14/240,565

(22) PCT Filed: Aug. 2, 2012

(86) PCT No.: PCT/EP2012/003298
§ 371 (c)(1),
(2), (4) Date: May 9, 2014

(87) PCT Pub. No.: WO2013/026525
PCT Pub. Date: Feb. 28, 2013

(65) Prior Publication Data
US 2015/0121954 A1    May 7, 2015

(30) Foreign Application Priority Data

Aug. 25, 2011  (DE) .................... 10 2011 111 630
Dec. 6, 2011   (EP) ..................... 11009613

(51) Int. Cl.
*F25J 3/00* (2006.01)
*B01D 1/00* (2006.01)
(Continued)

(52) U.S. Cl.
CPC ............ *B01D 1/0023* (2013.01); *B01D 3/322* (2013.01); *F25J 3/04745* (2013.01);
(Continued)

(58) Field of Classification Search
CPC ............ F22B 1/28; F22B 1/281; F22B 1/284; F22B 1/285; F22B 1/288; F25J 3/04745; F25J 3/04751; F25J 2250/02; F25J 2250/04; F25J 2250/10; F25J 2250/20; F25J 2250/30; F25J 2250/40; F25J 2250/42; F25J 3/04; F25J 3/04006; F25J 3/04012; F25J 3/04018; F25J 3/04024; F25J 3/0403; F25J 3/04036; F25J 4/04042; F25J 3/04048; F25J 3/04054; F25J 3/0406; F25J 3/04066; F25J 3/04072; F25J 3/04078; F25J 3/04084; F25J 3/0409; F25J 3/04096; F25J 2215/34; F25J 2215/36; H05B 6/02; H05B 6/10; H05B 6/108; F24H 2250/08; B01L 2300/1816
(Continued)

(56) References Cited

U.S. PATENT DOCUMENTS 2,427,361 A * 9/1947 Lofgren ................. F22B 1/281
                                                     219/628
2,762,208 A * 9/1956 Wolcott ............... F25J 3/04224
                                                  203/DIG. 18
(Continued)

FOREIGN PATENT DOCUMENTS

JP    5-296654 A    11/1993
JP    2002-115965 A    4/2002

OTHER PUBLICATIONS

International Search Report dated Oct. 9, 2012 issued in corresponding PCT/EP2012/003298 application (pp. 1-3).
(Continued)

*Primary Examiner* — Keith Raymond
(74) *Attorney, Agent, or Firm* — Millen, White, Zelano & Branigan, P.C.

(57) ABSTRACT

The method and the apparatus are used for the low-temperature fractionation of a fluid mixture. The fluid mixture is
(Continued)

introduced into a separation column. At least a portion of the sump liquid from the separation column is introduced into a sump evaporator and at least partly evaporated there. At least a portion of the vapor produced in the sump evaporator is led back into a lower section of the separation column. A top product is removed at the top of the separation column, and a sump product is removed from the sump of the separation column or from the sump evaporator. The sump evaporator is operated by means of inductive heating.

19 Claims, 2 Drawing Sheets

(51) Int. Cl.
  *B01D 3/32* (2006.01)
  *F25J 3/04* (2006.01)
(52) U.S. Cl.
  CPC ........ *F25J 3/04751* (2013.01); *F25J 2200/40* (2013.01); *F25J 2250/00* (2013.01); *F25J 2290/44* (2013.01)
(58) Field of Classification Search
  USPC .................................................. 62/643, 925
  See application file for complete search history.

(56) References Cited

U.S. PATENT DOCUMENTS

| | | | | |
|---|---|---|---|---|
| 4,564,001 | A | * | 1/1986 | Maeda .................. A47J 27/002 |
| | | | | 126/390.1 |
| 4,617,037 | A | | 10/1986 | Okada et al. |
| 5,075,097 | A | * | 12/1991 | Cameron ................ C01B 17/88 |
| | | | | 159/47.1 |
| 6,338,384 | B1 | * | 1/2002 | Sakaue ................ F25J 3/04412 |
| | | | | 165/166 |
| 6,351,970 | B1 | | 3/2002 | Hahn et al. |
| 8,796,598 | B2 | * | 8/2014 | England ................ A47J 27/002 |
| | | | | 219/621 |
| 2004/0182855 | A1 | * | 9/2004 | Centanni .................. A61L 2/07 |
| | | | | 219/628 |

OTHER PUBLICATIONS

G.C. Shah, "Troubleshooting Reboiler Systems", Chemical Engineering Progress, vol. 75, No. 7 (Jul. 1, 1979) pp. 53-58.
English Translation Abstract of JP 05-296654 published Nov. 9, 1993.
English Translation Abstract of JP 2002-115965 published Apr. 19, 2002.

* cited by examiner

METHOD AND APPARATUS FOR THE LOW-TEMPERATURE FRACTIONATION OF A FLUID MIXTURE

The invention relates to a method for the low-temperature fractionation of a fluid mixture wherein the fluid mixture is introduced into a separation column, at least part of the bottom liquid of the separation column is introduced into a bottom evaporator and at least partially evaporated there, at least in part of the vapor generated in the bottom evaporator is returned into a lower portion of the separation column, a top product is removed at the top of the separation column and a bottom product is removed at the bottom of the separation column or from the bottom evaporator.

"Low-temperature fractionation" is understood here as meaning a process in which the separation column is operated at a temperature that lies below the ambient temperature and is less than 200 K, preferably less than 190 K, most preferably less than 145 K.

The fluid mixture is introduced into the separation column in a gaseous, liquid or two-phase state, either at the top, at the bottom or at an intermediate point, and is separated in the separation column by countercurrent mass transfer of a rising vapor phase with a downwardly trickling liquid phase (distillation or rectification). The liquid phase arriving at the lower end (the bottom) of the separation column is referred to as bottom liquid. It is at least partially evaporated in a bottom evaporator by supplying heat. At least part of the vapor thereby produced forms the vapor phase rising up in the separation column. The bottom evaporator may in principle be arranged inside the separation column or in a separate vessel outside the separation column.

The top product is drawn off for example in a gaseous form at the top of the separation column; alternatively, it may be removed in liquid form from a top condenser. The bottom product is removed for example in liquid form from the bottom evaporator; alternatively, part of the vapor that is produced in the bottom evaporator may be carried away as bottom product.

The invention can be applied in particular to the fractionation of constituents of atmospheric air, in particular for the obtainment of krypton or xenon or a krypton- and xenon-enriched mixture from a fluid mixture enriched in krypton and xenon in comparison with the air.

In the case of methods of the type mentioned at the beginning, the heat is supplied to the bottom evaporator either by indirect heat exchange with a heating medium, in particular a liquid or gaseous heat transfer medium, or by means of an electrical resistance heating unit (electric heater). Such methods and their use for obtaining krypton or xenon or a krypton- and xenon-enriched mixture from a fluid mixture enriched in krypton and xenon in comparison with the air are known from JP 2002115965 A, U.S. Pat. No. 6,351,970 B1 and JP 05296654 A.

In the first case, a relatively complex heat exchanger with corresponding pipework is necessary and a suitable heating medium must be available.

If electrical energy is used for heating the bottom of a column in the cryogenic range, it must be ensured in particular that the heater is reliable, and possibly exchangeable, but also that the heating vessel is tightly sealed. Therefore, complex measures for ensuring accessibility must be taken in the heat-insulated low-temperature region. The production of resistance heat inherently accompanies the heating of the heating conductor. Therefore, the control and monitoring of the heating conductor temperature must also be provided.

The invention is based on the object of devising a method of the type mentioned at the beginning in such a way that the bottom evaporator can be designed to be relatively simple and reliable in terms of apparatus and/or control technology.

This object is achieved by the bottom evaporator being operated by inductive heating.

The heat required for the evaporation of the bottom liquid is therefore introduced into the bottom evaporator by means of electromagnetic induction.

As a result, the vessel of the bottom evaporator does not have to be perforated for the introduction of a heating medium or for the insertion of a heating conductor. There is no longer any problem of connections being sealed insufficiently tightly. The energy is transferred without any direct mechanical contact.

In the case of resistance heating, the aim is to achieve a great resistance, a small cross section, and consequently higher temperatures of the current conductor. In the case of inductive heating, on the other hand, the aim is to achieve a small resistance, and consequently lower temperatures of the primary current conductor. The risk of failure of the coil of an inductive heating unit is much less than in the case of a resistance heating unit. Therefore, easy access to the heating unit does not have to be ensured.

It is not necessary to monitor the temperature of the heating body of a magnetic material, since the magnetic properties of the material disappear when the Curie temperature is reached. At this temperature (approximately 360° C. for pure Ni), the magnetic energy is no longer absorbed in the heating body. Therefore, the maximum temperature of the heating area that can be achieved by induction is approximately equal to the (material-specific) Curie temperature of the heating body. The power control takes place by way of the voltage, current and/or frequency of the electrical excitation energy.

The following more specific configurations of the invention concern both a bottom evaporator, which is arranged in a separate vessel outside the separation column, and the alternative embodiment with a bottom evaporator arranged inside the separation column (arrangement "inside" relates here to the heat-emitting areas of the bottom evaporator); in the latter case, the vessel of the bottom evaporator is the same as the outer wall of the separation column in its bottom region.

In a first variant of how the invention is embodied, the wall region is produced from a magnetic, in particular a ferromagnetic, paramagnetic or diamagnetic material, such as for example an austenitic steel, aluminum or copper, or else from an alloy that contains one or more of these elements. The wall region of the vessel of the bottom evaporator is heated directly by induction. For this purpose, induction loops are arranged on the outer side of the vessel and the electromagnetic energy is introduced directly into the vessel wall. There is therefore no need for any special measures for taking up the electromagnetic energy. An apparatus that can be realized particularly easily is obtained.

The frequency of the inducing electromagnetic field should preferably be chosen such that the depth of penetration is at most $\frac{1}{3}$, preferably at most $\frac{1}{4}$, of the vessel wall thickness. (The "depth of penetration" refers to that value at which the current density has fallen to 1/e of its maximum value.)

For a vessel wall of a non-magnetic high-grade steel of a thickness of approximately 6 mm, as is customary for example in the area of obtaining krypton and xenon, a depth of penetration of approximately 1.5 mm is achieved at a temperature of about −135° C. with a frequency of 40 kHz.

A commercially available frequency converter is used for generating the corresponding frequency.

A second embodiment, in comparison with the first, additionally has a heating body, which is arranged on the outer side of the vessel wall. The heating body is heated directly by induction. The inductively generated heat is given off to the wall of the vessel by conduction.

The heating body is produced from a different material than the vessel wall, in particular from a magnetic material, preferably from a ferromagnetic, electrically conducting material, for example from iron, nickel, cobalt or a ferromagnetic alloy with at least one of the aforementioned elements (for example from a ferritic steel). This makes it possible to work with a conventional electromagnetic power frequency in the range from 20 to 120 Hz.

The heating body is fastened on the outer side of the vessel wall by a suitable joining method, for example by cold rolling, hot rolling, explosion welding or conventional welding. It may be formed by a single metal sheet or by multiple sheet strips.

The arrangement on the outer side requires relatively little production complexity; furthermore, there is a relatively free choice of the material, since it does not come into direct contact with the bottom liquid of the separation column.

In a third embodiment of the invention, the heating body is arranged on the inner side of the wall of the bottom evaporator, and the heating body is heated directly by induction. Consequently, on its inner side, the heating body is in direct contact with the bottom liquid to be heated. Consequently, the heat transfer is more efficient. However, the material of the heating body must be resistant to the bottom liquid or protected by a corresponding coating.

Otherwise, this embodiment corresponds with regard to the configuration of the heating body and its connection to the vessel wall to the second embodiment.

According to a fourth embodiment of the invention, a heating body is arranged inside the vessel of the bottom evaporator, at a distance from the wall of the bottom evaporator; this heating body is heated directly by induction. As a result, the heating body is exposed on both sides to the flow of the bottom liquid to be heated, so that the heat transfer is improved further. It may for example have the form of a hollow cylinder, the diameter of which is smaller than the inside diameter of the vessel of the bottom evaporator. Alternatively, it may also be configured as a helically coiled metal sheet. With regard to the material of the heating body, the same applies as in the case of the second embodiment. In addition, here too the use of a paramagnetic or diamagnetic material is possible. In this case, an adaptation of the excitation frequency to the values described in the first variant of the embodiment is necessary.

In a particularly preferred application of the method according to the invention for obtaining krypton and xenon from air, a mixture of air gases enriched with krypton and xenon is used as the fluid mixture. In this case, either the krypton and xenon concentration is increased in the separation column (krypton-xenon enrichment column), in that oxygen is separated out from the fluid mixture, or the separation column represents a krypton-xenon column, in which krypton and xenon are separated from one another. Furthermore, use in separation columns for separating trace impurities out from high-purity and ultrapure gases is possible, and also in the distillative obtainment or purification of hydrogen and helium.

The invention also relates to an apparatus for low-temperature fractionation of a fluid mixture, comprising a separation column and a bottom evaporator for evaporating bottom liquid of the separation column, comprising means for introducing the fluid mixture into the separation column, comprising means for introducing vapor generated in the bottom evaporator into a lower portion of the separation column, comprising means for drawing off a top product at the top of the separation column and comprising means for removing a bottom product at the bottom of the separation column or from the bottom evaporator. In accordance with the invention, the bottom evaporator has an induction heating unit. The apparatus according to the invention may be supplemented by apparatus features that correspond to the features described above for the inventive method.

If the bottom evaporator is installed in the separation column, the "means for introducing vapor generated in the bottom evaporator into a lower portion of the separation column" are formed by the portion of the vessel between the lowermost mass transfer portion of the separation column and the bottom evaporator, through which the vapor flows out of the bottom evaporator into the lower portion of the separation column.

The invention and further details of the invention are explained more specifically below on the basis of exemplary embodiments that are represented in the drawings, in which.

Figure 1:
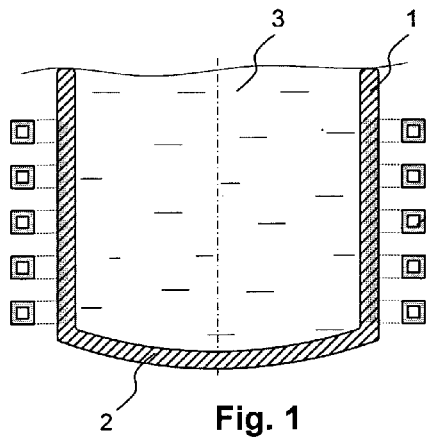
FIG. 1 shows an example of the first embodiment of the invention.

In FIGS. 1-4, only the lower part of the separation column, which at the same time forms the bottom evaporator, is shown. The bottom evaporator is therefore installed in the separation column. The vessel of the bottom evaporator is identical to the lower part of the outer wall of the separation column. (Alternatively, the bottom evaporator could be accommodated in a separate vessel; the embodiments of the induction heating unit that are shown in the drawings could be similarly applied there.)

In FIG. 1, the vessel of the bottom evaporator has a cylindrical outer wall 1 and a convex base 2. Inside it there is bottom liquid 3 from the separation column. Arranged outside the outer wall 1 are the windings 4 of one or more coils, which lead around the outer wall and are subjected to an alternating current of 40 kHz. The portion of the outer wall 1 that is situated within the windings 4 is heated directly by induction. The heat is given off via the inner side of the vessel to the bottom liquid 3, which thereby partially evaporates. The vapor bubbles thereby formed (not represented) rise up to the surface of the bottom liquid and form there the vapor phase rising up in the separation column.

The coil(s) may be fastened to the outer wall or else (like an induction hob) underneath the base on which the separation column is also standing.

Figure 2:
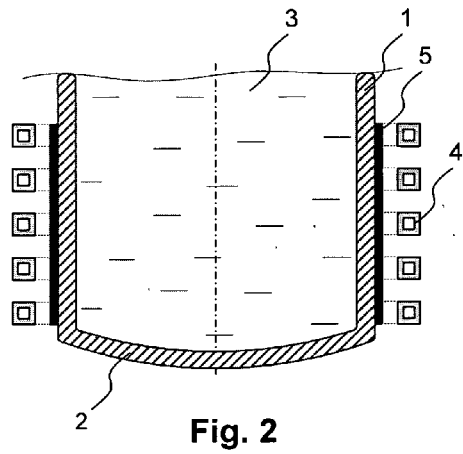
FIG. 2 shows an example of the second embodiment of the invention.

The exemplary embodiment of FIG. 2 additionally has a cylindrical heating body 5, for example of nickel, which is attached to the outer side of the outer wall 1 of the vessel and is in mechanical contact with it over the full surface area. The windings 4 and the alternating current frequency (in the example 50 Hz) are formed such that the heating body takes up the energy of the electromagnetic field by induction. The heat thereby taken up is transferred into the outer wall 1 of the vessel by conduction.

Figure 3:
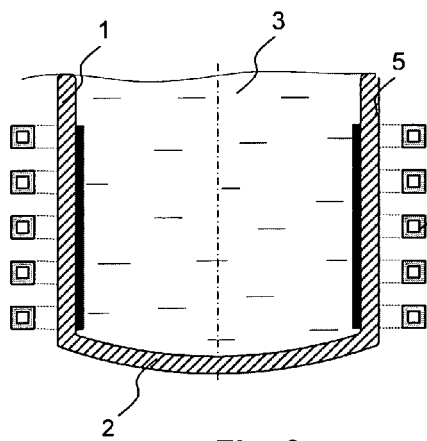
FIG. 3 shows an example of the third embodiment of the invention.

In the exemplary embodiment of FIG. 3, the heating body 5 is instead arranged on the inner side of the outer wall 1 of the vessel.

Figure 4:
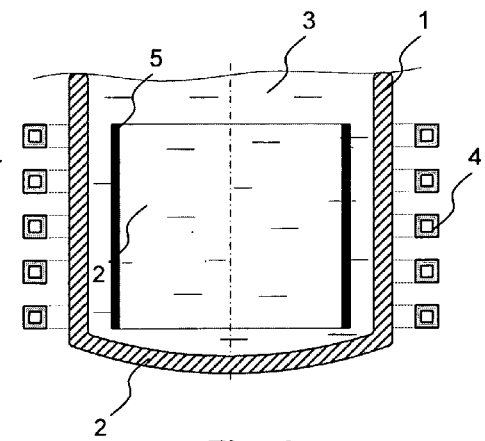
FIG. 4 shows an example of the fourth embodiment of the invention.

FIG. 4 shows a heating body 5, which is formed as in FIGS. 2 and 3 as a hollow cylinder, but as a difference from that is arranged inside the vessel, at a distance from the outer wall 1.

As a difference from the embodiments in FIGS. 3 and 4, the heat-emitting area of the heating body 5 can be increased by various measures. For example, multiple concentric cylinders with different diameters may be combined. Alternatively, the metal sheet of the heating body may be coiled helically around the axis of the column. In addition or alternatively, in the case of the embodiments of FIGS. 3 and 4, the surface of the heating body may be provided with ribs or the heating body may be perforated by holes; in the case of the embodiments of FIGS. 1 and 2, the inner side of the vessel wall may be provided with ribs.

Figure 5:
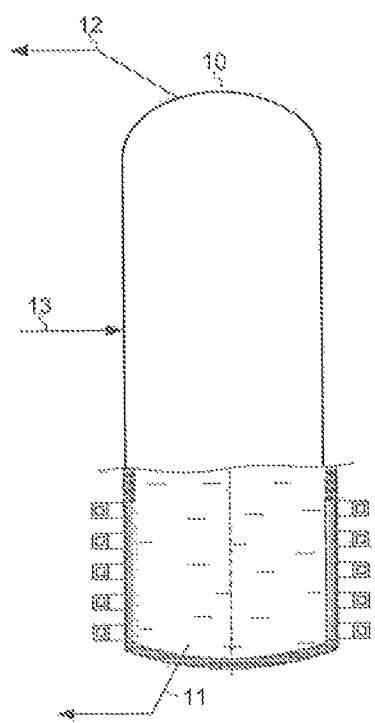
FIG. 5 shows a full separation column with a bottom evaporator heated by inductive heating.

FIG. 5 shows a complete separation column. A feed mixture is introduced into the separation column via line 13. The bottom product is removed from the bottom of the separation column via line 11, and the top product is removed from the top 10 of the separation column via line 12.

The invention claimed is:

1. A method for low-temperature fractionation of a fluid mixture comprising:
   introducing said fluid mixture into a separation column to produce a top gaseous product and a bottom liquid,
   introducing at least part of said bottom liquid into a bottom evaporator wherein said bottom liquid is at least partially evaporated in said bottom evaporator to form a vapor,
   returning at least part of said vapor generated in the bottom evaporator to a lower portion of said separation column,
   removing said top gaseous product from the top of said separation column, and
   removing a bottom product from the bottom of said separation column or from said bottom evaporator,
   wherein said bottom evaporator is heated by inductive heating.

2. The method as claimed in claim 1, wherein said bottom evaporator comprises a vessel having a wall, and said wall of said vessel is heated directly by induction.

3. The method as claimed in claim 1, wherein said bottom evaporator comprises a vessel having a wall, and a heating body is arranged on the outer side of said wall of said vessel, said heating body is heated directly by induction and the inductively generated heat is transferred to said wall of said vessel by conduction.

4. The method as claimed in claim 1, wherein said bottom evaporator comprises a vessel having a wall, and a heating body is arranged on the inner side of said wall of said vessel, and said heating body is heated directly by induction.

5. The method as claimed in claim 1, wherein said bottom evaporator comprises a vessel having a wall, and a heating body is arranged inside said vessel of said bottom evaporator, at a distance from said wall of said vessel, said heating body is heated directly by induction.

6. The method as claimed in claim 1, wherein said fluid mixture is a mixture of air gases enriched with krypton and xenon.

7. An apparatus for the low-temperature fractionation of a fluid mixture, comprising:
   a separation column and a bottom evaporator for evaporating bottom liquid of the separation column, means for introducing a fluid mixture into the separation column, means for introducing vapor generated in the bottom evaporator into a lower portion of the separation column, means for drawing off a top product at the top of the separation column, means for removing a bottom product at the bottom of the separation column or from the bottom evaporator and an induction heating unit for heating the bottom evaporator.

8. The method as claimed in claim 4, wherein said heating body comprises multiple concentric cylinders with different diameters.

9. The method as claimed in claim 5, wherein said heating body comprises multiple concentric cylinders with different diameters.

10. The method as claimed in claim 2, wherein the inner side of the vessel wall is provided with ribs.

11. The method as claimed in claim 3, wherein the inner side of the vessel wall is provided with ribs.

12. The method as claimed in claim 5, wherein said heating body is provided with ribs.

13. The method as claimed in claim 4, wherein said heating body is perforated.

14. The method as claimed in claim 5, wherein said heating body is perforated.

15. The method as claimed in claim 2, wherein said bottom evaporator further comprises a heating body which is heated directly by induction and which is arranged on the outer side of said wall of said vessel or the inner side of said wall of said vessel, and said is heating body is in the form of a hollow cylinder.

16. The method as claimed in claim 3, wherein said heating body is in the form of a hollow cylinder.

17. The method as claimed in claim 4, wherein said heating body is in the form of a hollow cylinder.

18. The method as claimed in claim 5, wherein said heating body is in the form of a hollow cylinder.

19. The method as claimed in claim 4, wherein said heating body is provided with ribs.

* * * * *